United States Patent

Motoyoshi et al.

(10) Patent No.: US 10,870,201 B2
(45) Date of Patent: Dec. 22, 2020

(54) SCARA ROBOT

(71) Applicant: Seiko Epson Corporation, Tokyo (JP)

(72) Inventors: Masaki Motoyoshi, Azumino (JP);
Ryosuke Imai, Matsumoto (JP);
Tetsuya Kawase, Azumino (JP);
Toshinori Hiraide, Fujimi (JP)

(73) Assignee: Seiko Epson Corporation (JP)

( * ) Notice: Subject to any disclaimer, the term of this patent is extended or adjusted under 35 U.S.C. 154(b) by 127 days.

(21) Appl. No.: 16/170,495

(22) Filed: Oct. 25, 2018

(65) Prior Publication Data

US 2019/0126469 A1 May 2, 2019

(30) Foreign Application Priority Data

Oct. 26, 2017 (JP) .................................. 2017-206899

(51) Int. Cl.
*B25J 9/16* (2006.01)
*B25J 18/00* (2006.01)

(52) U.S. Cl.
CPC ............. *B25J 9/1602* (2013.01); *B25J 18/00* (2013.01); *G05B 2219/40301* (2013.01)

(58) Field of Classification Search
CPC . B25J 9/1602; B25J 18/00; B25J 9/044; B25J 13/088; G05B 2219/40301
See application file for complete search history.

(56) References Cited

U.S. PATENT DOCUMENTS

| | | | | |
|---|---|---|---|---|
| 2011/0204838 A1* | 8/2011 | Nakasugi | ............... | B25J 9/1641 318/689 |
| 2012/0210816 A1* | 8/2012 | Izumi | .................... | B25J 9/1641 74/490.03 |
| 2013/0046409 A1* | 2/2013 | Tanaka | .................... | B25J 9/103 700/258 |
| 2018/0275083 A1* | 9/2018 | Kiriyama | ........... | G01N 33/2858 |
| 2018/0361592 A1* | 12/2018 | Motoyoshi | ........... | B25J 17/0275 |
| 2019/0260273 A1* | 8/2019 | Nagamatsu | ............ | B25J 9/1641 |

FOREIGN PATENT DOCUMENTS

| | | |
|---|---|---|
| JP | 2003-018880 A | 1/2003 |
| JP | 2012-171072 A | 9/2012 |
| JP | 2013-211958 A | 10/2013 |

* cited by examiner

*Primary Examiner* — Bickey Dhakal
(74) *Attorney, Agent, or Firm* — Harness, Dickey & Pierce, P.L.C.

(57) ABSTRACT

A SCARA robot includes a first arm configured to be moved in a direction different from a gravity direction; a first motor configured to drive the first arm; a first speed reducer, an input shaft of which is connected to the first motor and an output shaft of which is connected to the first arm; and a first output-side angle sensor configured to detect an operating position on an output side of the first speed reducer, wherein the first motor is controlled on the basis of an output of the first output-side angle sensor.

20 Claims, 10 Drawing Sheets

SCARA ROBOT

BACKGROUND

1. Technical Field

The present invention relates to a technique for improving accuracy of operation in a robot.

2. Related Art

A rotation output obtained by changing the speed of a rotation output of a motor via a transmission has been used. It has been demanded to change the rotation output after the change to a highly accurate rotation output for accurate rotation at preset rotation speed. As a technique for obtaining such a highly accurate rotation output, there is a technique disclosed in JP-A-2013-211958 (Patent Literature 1). A device disclosed in Patent Literature 1 is a device for driving an image bearing body of an image forming apparatus at set rotating speed.

The device disclosed in Patent Literature 1 includes a motor, a first sensor for detecting output rotating speed of the motor, a gear speed reducer for reducing the speed of output shaft rotation of the motor, a second sensor for detecting rotating speed of an output shaft of the gear speed reducer, and a controller for controlling motor rotating speed. The controller receives detection signals from the first and second sensors and controls the motor rotating speed to change the rotating speed of the speed reducer output shaft to set speed. In the technique disclosed in Patent Literature 1, the second sensor for detecting the rotating speed of the output shaft of the gear speed reducer is provided and an output of the second sensor is used for the control to reduce an error of the rotation output due to the speed reducer, that is, lost motion (an error of positions asymmetrical with respect to the direction of operation due to a static frictional force or elastic torsion of a shaft) and backlash (an error of positions due to a gap between components that transmit a driving force) and stabilize the rotating speed of the output shaft.

Related art is also disclosed in JP-A-2003-18880 (Patent Literature 2).

In a robot including a plurality of joints and a plurality of arms, for the respective joints, motors for driving the joints and speed reducers for reducing the speed of rotation outputs of the motors and transmitting the rotation outputs to the arms are provided. Therefore, if sensors for detecting rotating speeds of outputs of the motors (inputs to the speed reducers) and sensors for detecting rotating speeds of outputs of the speed reducers are provided for all the joints including the speed reducers, the configuration of the device is complicated and manufacturing cost increases. Because a pair of angle sensors on the input side and the output side of the speed reducer is disposed in each of the joints, the dimensions of the robot increase. The shape of the robot is sometimes limited. However, it has not been sufficiently discussed in which joints the sensors for detecting rotating speeds of outputs of the speed reducers should be provided in the robot including the plurality of joints and the plurality of arms. Such a problem is common to devices required to accurately control not only rotating speed but also a position, speed, and acceleration.

SUMMARY

An advantage of some aspects of the invention is to solve at least a part of the problems described above, and the invention can be implemented as the following aspects or application examples.

(1) According to an aspect of the invention, a SCARA robot is provided. The SCARA robot includes: a first movable section configured to be moved in a direction different from a gravity direction; a first driving section configured to output a driving force for moving the first movable section; a first transmitting section configured to transmit the output of the first driving section to the first movable section; and a first output-position detecting section configured to detect an operating position on an output side of the first transmitting section. The first driving section is controlled on the basis of an output of the first output-position detecting section.

With such a configuration, in the SCARA robot, concerning the operation of the first movable section that does not always receive a force in a fixed direction because the first movable section is moved in the direction different from the gravity direction and in which, as a result, an error of a position easily occurs, the error can be effectively reduced using the output of the first output-position detecting section.

(2) The SCARA robot according to the aspect may be configured such that the first movable section is rotated by the first driving section and the first transmitting section in a direction in which a surface defined by a circumferential direction of rotation does not include the gravity direction. With such a configuration, concerning the operation of the first movable section rotated in the direction in which the surface defined by the circumferential direction of the rotation does not include the gravity direction, the error can be effectively reduced using the output of the first output-position detecting section.

(3) The SCARA robot according to the aspect may be configured such that the SCARA robot further includes a base not moved by operation of the SCARA robot, and the first movable section is connected to the base via one joint. In such a configuration, the first movable section is moved in the direction different from the gravity direction via the one joint connected to the base. Therefore, an error of a position, speed, or acceleration of the operation of the first movable section greatly affects a position, speed, or acceleration of a component provided at the tip of the first movable section. In the configuration, the first driving section configured to drive such a first movable section is controlled on the basis of the output of the first output-position detecting section. Therefore, the position of the distal end of the SCARA robot can be accurately controlled.

(4) The SCARA robot according to the aspect may be configured such that the first movable section is connected to the base via one rotary joint, the first output-position detecting section includes: a scale rotated together with the first movable section by the driving force of the first driving section; and a detector provided in the base and configured to read the scale, and, when the first movable section takes a posture in which, when viewed from a direction of a rotation axis of the first movable section, a longitudinal direction of the base and an extending direction of the first movable section from the rotation axis coincide with each other and an overlapping region of the base and the first movable section is smaller, the detector is provided, with respect to the rotation axis, on an opposite side of the extending direction of the first movable section.

Heat generated in the first driving section is transmitted to the first movable section and the base. As a result, the first movable section and the base are respectively deformed by the heat. In the configuration explained above, the detector is provided, with respect to the rotation axis of the first movable section, on the side of the longitudinal direction in which the heat more easily escapes. Therefore, compared with a configuration in which the detector is provided on the side of a latitudinal direction, it is less likely that the position of the detector is shifted by the heat. Therefore, even when the first driving section generates heat, an operating position on the output side of the first transmitting section can be accurately detected.

(5) The SCARA robot according to the aspect may be configured such that the first movable section is connected to the base via one rotary joint, a rotation axis of the first movable section is present, when viewed from a direction of the rotation axis of the first movable section, in a position where a distance from one end in a longitudinal direction of the base is smaller than a distance from another end in the longitudinal direction, the first output-position detecting section includes: a scale rotated together with the first movable section by the driving force of the first driving section; and a detector provided in the base and configured to read the scale, and the detector is provided on a side of the other end with respect to the rotation axis of the first movable section when viewed from the direction of the rotation axis of the first movable section.

Heat generated in the first driving section is transmitted to the first movable section and the base. As a result, the first movable section and the base are respectively deformed by the heat. In the configuration explained above, the detector is provided, with respect to the rotation axis of the first movable section, on the other end side where a larger portion of the base is present than on one end side. Therefore, compared with a configuration in which the detector is provided on the one end side, it is less likely that the position of the detector is shifted by the heat. Therefore, even when the first driving section generates heat, an operating position on the output side of the first transmitting section can be accurately detected.

(6) The SCARA robot according to the aspect may be configured such that the SCARA robot further includes a base not moved by operation of the SCARA robot, and the first movable section is connected to the base via a rotary joint closest to the base among a plurality of rotary joints included in the SCARA robot. In such a configuration, the first movable section is rotated with the direction different from the gravity direction as a rotation axis via the rotary joint closest to the base among the plurality of rotary joints. Therefore, an error of a position, speed, or acceleration of the operation of the first movable section greatly affects a position, speed, or acceleration of a component provided at the tip of the first movable section. In the configuration, the first driving section configured to drive such a first movable section is controlled on the basis of the output of the first output-position detecting section. Therefore, the position of the distal end of the SCARA robot can be accurately controlled.

(7) The SCARA robot according to the aspect may be configured such that the first movable section is moved in a horizontal direction. With such a configuration, the SCARA robot is less easily affected by the gravity. As a result, concerning the operation of the first movable section in which an error easily occurs, the error can be effectively reduced using the output of the first output-position detecting section.

(8) The SCARA robot according to the aspect may be configured such that the SCARA robot further includes: a second movable section configured to be moved in the gravity direction; a second driving section configured to output a driving force for moving the second movable section; and a second transmitting section configured to transmit the output of the second driving section to the second movable section, and the SCARA robot does not include an output-position detecting section configured to detect an operating position on an output side of the second transmitting section. In such a configuration, the SCARA robot does not include the output-position detecting section for the second movable section that always receives a force in a fixed direction because the second movable section is moved in the gravity direction and in which, as a result, an error less easily occurs. As a result, the configuration of the SCARA robot can be simplified compared with a configuration in which the output-position detecting section is provided for the second movable section as well.

(9) The SCARA robot according to the aspect may be configured such that the SCARA robot further includes: a third movable section configured to be moved in the direction different from the gravity direction; a third driving section moved according to a position of the first movable section and configured to output a driving force for moving the third movable section; a third transmitting section configured to transmit the output of the third driving section to the third movable section; and a third output-position detecting section configured to detect an operating position on an output side of the third transmitting section, and the third driving section is controlled on the basis of an output of the third output-position detecting section.

With such a configuration, in the SCARA robot, concerning the operations of the first movable section and the third movable section that do not always receive a force (the gravity) in a fixed direction because the first movable section and the third movable section are moved in the direction different from the gravity direction and in which, as a result, an error of a position easily occurs, the error can be effectively reduced using the outputs of the first output-position detecting section and the third output-position detecting section. As a result, an error in the operation of the entire SCARA robot can be effectively reduced.

(10) The SCARA robot according to the aspect may be configured such that the first transmitting section changes speed of the output of the first driving section and transmits the output to the first movable section.

(11) The SCARA robot according to the aspect may be configured such that the SCARA robot further includes an input-position detecting section configured to detect an operating position on an input side of the first transmitting section, and the first driving section is controlled on the basis of an output of the input-position detecting section. With such a configuration, concerning the operation of the first movable section, an error can be effectively reduced on the basis of the operating position on the input side of the first transmitting section and the operating position on the output side of the first transmitting section.

Not all of a plurality of constituent elements in the aspects of the invention explained above are essential. To solve a part or all of the problems described above or to achieve a part or all of the effects described in this specification, apart of the plurality of constituent elements can be changed, deleted, and replaced with new other constituent elements and a part of limitation contents of the plurality of constituent elements can be deleted as appropriate. To solve a part or all of the problems described above or to achieve a part or all of the effects described in this specification, apart or all of the technical features included in one aspect of the invention described above can be combined with a part or all of the technical features included in the other configurations of the invention described above to form an independent aspect of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
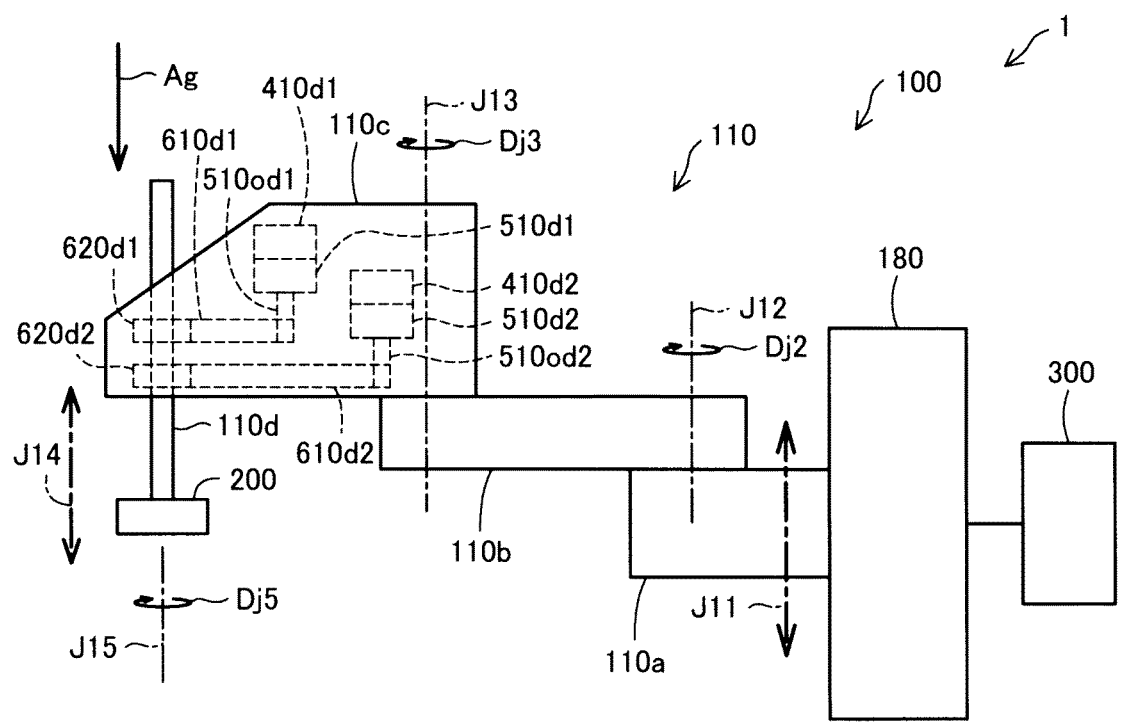
FIG. 1 is an explanatory diagram schematically showing a robot system in a first embodiment.

FIG. 1 is an explanatory diagram schematically showing a robot system 1 in a first embodiment. The robot system 1 in this embodiment includes a robot 100, an end effector 200, and a control device 300.

The robot 100 is a SCARA robot. In this specification, the "SCARA robot" is a robot including a plurality of movable sections configured to rotate with directions parallel to one another as rotation axes and not including a movable section configured to rotate with a direction perpendicular to the rotation axes of the plurality of movable sections as a rotation axis. In this specification, the "movable section" is referred to as "arm element". The arm element is explained below.

The robot 100 is a five-axis robot including an arm 110 including five joints J11 to J15. The arm 110 is connected to, via the joint J11, a base 180 not moved by the operation of the robot 100 conforming to control of the control device 300. Note that "not moved by the operation of the robot" means that the base is not moved according to the control of the control device. Therefore, even when a base vibrates according to the operation of the robot, the base satisfies a requirement of "the base not moved by the operation of the robot".

In the arm 110, the joints J11 and J14 are linear motion joints. The joints J12, J13, and J15 are rotary joints. A component between joints adjacent to each other among the plurality of joints configuring the arm 110 is referred to as "arm element" in this specification. In FIG. 1, an arm element 110a between the joint J11 and the joint J12, an arm element 110b between the joint J12 and the joint J13, an arm element 110c between the joint J13 and the joint J14, and an arm element 110d configuring the distal end of the arm 110 and moved by the joints J14 and J15 are shown with reference signs attached thereto. The arm element 110a is connected to the base 180 via the joint J11.

By rotating or linearly advancing the five joints J11 to J15 respectively with servomotors, the robot 100 can dispose the end effector 200 attached to the distal end portion of the arm 110 in a designated position in a three-dimensional space and in a designated posture. Note that a point representing the position of the end effector 200 in the three-dimensional space is referred to as TCP (Tool Center Point) as well.

The robot 100 respectively includes, in the joints J12 and the joint J13 (see FIG. 1), servomotors 410, speed reducers 510, motor angle sensors 420, and output-side angle sensors 520. Configurations and functions of the joint J12 and the joint J13 are explained in detail below. The arm element 110b rotated via the joint J12 and the arm element 110c rotated via the joint J13 are respectively rotated in the horizontal direction. That is, the arm elements 110b and 110c are rotated in a direction in which surfaces defined by circumferential directions Dj2 and Dj3 of rotation do not include a gravity direction Ag. In this specification, in addition to a form in which the arm elements are linearly moved in the direction different from the gravity direction, such a rotary motion is also described as "moved in the direction different from the gravity direction". In this specification, a direction including a shift of 5° or less with respect to the strict horizontal direction is also described as "horizontal direction".

The robot 100 respectively includes, in the joint J14 and the joint J15 (see FIG. 1), the servomotors 410, the speed reducers 510, belts 610, and cylinder sections 620. The servomotor 410, the speed reducer 510, the belt 610, and the cylinder section 620 included in the joint J14 are respectively described as servomotor 410d1, speed reducer 510d1, belt 610d1, and cylinder section 620d1. The servomotor 410, the speed reducer 510, the belt 610, and the cylinder section 620 included in the joint J15 are respectively described as servomotor 410d2, speed reducer 510d2, belt 610d2, and cylinder section 620d2.

The speed reducer 510d1 converts a rotation input from the servomotor 410d1 into a rotation output having lower rotating speed than the rotation input and outputs the rotation output from an output shaft 510od1. The speed reducer 510d2 converts a rotation input from the servomotor 410d2 into a rotation output having lower rotating speed than the rotation input and outputs the rotation output from an output shaft 510od2.

A male screw is formed on the outer surface of a part of the arm element 110d. A female screw is provided on the inner surface of the cylinder section 620d1. The cylinder section 620d1 is fit with the male screw portion of the arm element 110d. The portion of the arm element 110d functions as a ball screw. The cylinder section 620d1 is a ball screw nut. The cylinder section 620d1 is connected to the output shaft 510od1 of the speed reducer 510d1 via the belt 610d1 and rotated by the servomotor 410d1. In a state in which the cylinder section 620d2 is fixed, when the cylinder section 620d1 is rotated, the arm element 110d functioning as the ball screw moves along a direction indicated by an arrow J14 with respect to the cylinder section 620d1 without rotating. The movement of the arm element 110d by the joint J14 is a movement along the gravity direction Ag.

The cylinder section 620d2 is a spline outer cylinder. The cylinder section 620d2 defines a direction of the arm element 110d having a direction indicated by J15 as a center axis of rotation. The cylinder section 620d2 and the arm element 110d are fit with each other to be capable of relatively moving along the direction indicated by the arrow J14. The cylinder section 620d2 is connected to the output shaft 510od2 of the speed reducer 510d2 via the belt 610d2 and rotated by the servomotor 410d2. In a state in which the cylinder section 620d1 is fixed, when the cylinder section 620d2 is rotated, the arm element 110d rotates with a direction indicated by J15 as a center axis (see an arrow Dj5) without moving in the direction indicated by an arrow J14. In this specification, in addition to the form in which arm element is linearly moved in the gravity direction, such a rotary motion is also described as "moved in the gravity direction".

The linear motion joint J11 connected to the base 180 includes the same mechanism as the linear motion joint J14. In the linear motion joint J11, a ball screw for moving the arm element 110a in the direction indicated by the arrow J11 is configured to fix a direction without rotating.

The end effector 200 is attached to the distal end of the arm 110. The end effector 200 is controlled by the control device 300 to be capable of gripping a workpiece or releasing a gripped workpiece. As a result, for example, the robot 100 and the end effector 200 are controlled by the control device 300 to be capable of gripping and moving the workpiece, which is a work target object. Note that, in FIG. 1, to facilitate understanding of a technique, the end effector 200 is indicated by a simple square.

The control device 300 is a control device that controls the robot 100. The control device 300 is connected to the robot 100. The control device 300 includes a computer including a RAM 301, a ROM 302, and a CPU 303. The CPU 303 loads computer programs stored in the ROM 302 to the RAM 301 and executes the computer programs to thereby realize various functions.

Figure 2:
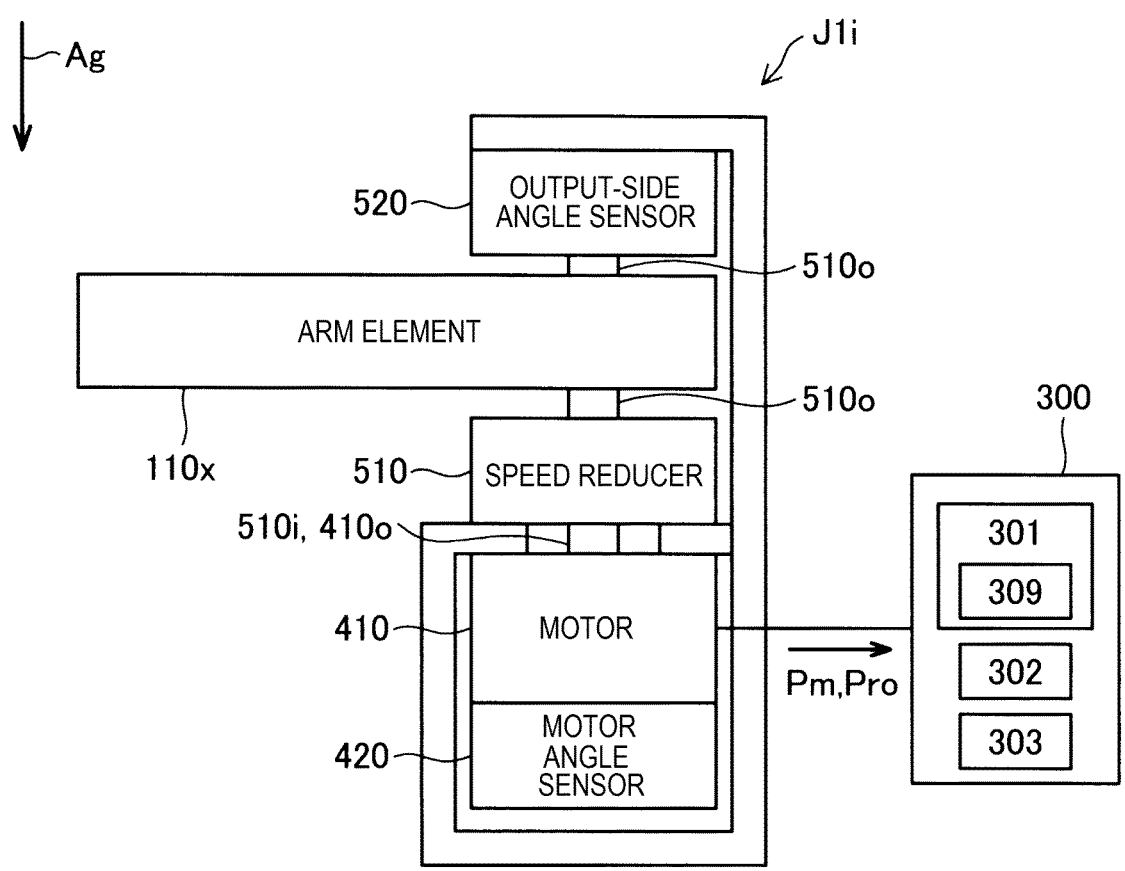
FIG. 2 is a block diagram showing components provided in joints of a robot.

FIG. 2 is a block diagram showing components provided in the joints J12 and J13 (see FIG. 1) of the robot 100. In FIG. 2, to facilitate understanding of the technique, the components are indicated by rectangles. In FIG. 2, an arm element, which is specifically the arm element 110b or the arm element 110c, is described as arm element 110x. A joint in which the arm element 110x is rotated is described as joint J1i (i=2 and 3). In the following explanation, the technical content of the present disclosure is explained with reference to, as an example, a set of the arm element 110x and the servomotor 410, the motor angle sensor 420, the speed reducer 510, and the output-side angle sensor 520 provided in one joint J1i for rotating the arm element 110x.

The servomotor 410 receives supply of an electric current from the control device 300 and generates a driving force for moving the arm element. More specifically, the servomotor 410 receives supply of an electric current from the control device 300 and rotates an output shaft 410o of the servomotor 410.

The motor angle sensor 420 detects an angular position Pm of the output shaft 410o of the servomotor 410. The motor angle sensor 420 is a rotary encoder. The angular position Pm of the output shaft 410o detected by the motor angle sensor 420 is transmitted to the control device 300. The control device 300 controls the servomotor 410 on the basis of the angular position Pm of the output shaft 410o.

The speed reducer 510 transmits an output of the servomotor 410 to the arm element 110x. The arm element 110x is connected to the speed reducer 510 not via another arm element driven by another servomotor. The speed reducer 510 includes an input shaft 510i and an output shaft 510o. The speed reducer 510 converts a rotation input to the input shaft 510i into a rotation output having lower rotating speed than the rotation input and outputs the rotation output from the output shaft 510o. The speed reducer 510 is specifically a wave gear speed reducer.

The input shaft 510i of the speed reducer 510 is connected to the output shaft 410o of the servomotor 410. An angular position of the input shaft 510i is equal to the angular position Pm of the output shaft 410o of the servomotor 410. Therefore, the motor angle sensor 420, which can detect the angular position Pm of the output shaft 410o of the servomotor 410, detects the angular position of the input shaft 510i of the speed reducer 510.

The speed reducer 510 generates a cyclic transmission error with respect to a continuous constant input from the output shaft 410o of the servomotor 410. That is, rotating speed and an angular position of the output shaft 510o of the speed reducer 510 include cyclic shifts with respect to a continuous rotation input of constant speed from the output shaft 410o of the servomotor 410.

The arm element 110x is fixed to the output shaft 510o of the speed reducer 510 of the joint J1i. As a result, the arm element 110x is rotated in the joint J1i via the speed reducer 510 according to the rotation of the output shaft 410o of the servomotor 410.

A part of the components of the output-side angle sensor 520 is present in the arm element 110x. Another part of the components of the output-side angle sensor 520 is present in a component (specifically, another arm element adjacent to the arm element 110x or the base) connected to the arm element 110x via the joint J1i. In FIG. 2, to facilitate understanding of the technique, the output-side angle sensor 520 is indicated by one functional block. The output-side angle sensor 520 detects an angular position Pro of the output shaft 510o of the speed reducer 510. That is, whereas the motor angle sensor 420 detects the operating position Pm on the input side of the speed reducer 510, the output-side angle sensor 520 detects an operating position Pro on the output side of the speed reducer 510. The angular position Pro of the output shaft 510o detected by the output-side angle sensor 520 is transmitted to the control device 300.

The control device 300 controls the servomotors 410 of the joints on the basis of the angular position Pro of the output shaft 510o of the speed reducer 510 and the angular position Pm of the input shaft 510i of the speed reducer 510 such that the end effector 200 (more specifically, the TCP) located at the distal end of the arm is located in a target position. By adopting such a configuration, compared with a form in which the servomotor 410 is controlled on the basis of only one of the angular position Pro of the output shaft 510o and the angular position Pm of the input shaft 510i, the angular position pm, the speed, and the acceleration of the output shaft 410o can be more accurately controlled. A functional section of the CPU 303 of the control device 300 configured to control the servomotors of the robot 100 is shown in FIG. 2 as a "control section 309".

Note that, in this specification, in a transmitting section (in this embodiment, the speed reducer 510) configured to transmit a driving force, an operating position of a member (in this embodiment, the input shaft 510*i*) configured to receive an input driving force is described as "operating position on the input side". In the transmitting section configured to transmit a driving force, an operating position of a member (in this embodiment, the output shaft 510*o*) configured to transmit an output driving force to another component is described as "operating position on the output side".

Figure 3:
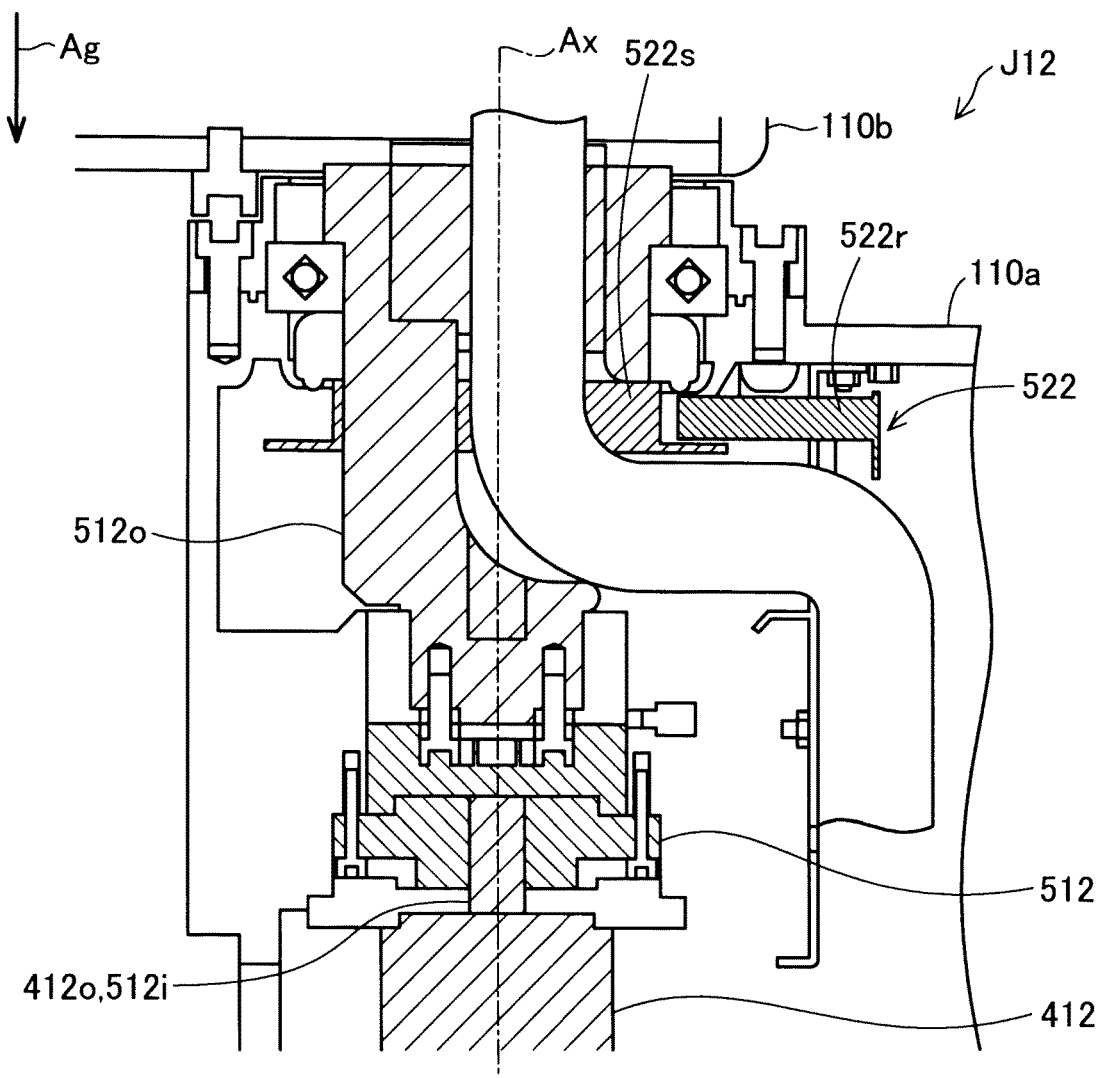
FIG. 3 is an explanatory diagram showing a specific configuration around an output-side angle sensor in the joint.

FIG. 3 is an explanatory diagram showing a specific configuration around an output-side angle sensor 522 in the joint J12 (see FIG. 1). The joint J12 includes a servomotor 412, a motor angle sensor, a speed reducer 512, and the output-side angle sensor 522. Reference numerals attached to the components are reference numerals in which ends of the reference numerals attached to the corresponding components shown in FIG. 2 are changed from 0 to 2. In FIG. 3, to facilitate distinction of the components, the components are shown with hatchings applied thereto. In FIG. 3, hatched portions are not always portions showing cross sections of members. Note that the motor angle sensor configured to detect an angular position of an output shaft of the servomotor 412 is not shown in FIG. 3 because the motor angle sensor is located on the outer side of a range shown in FIG. 3.

The output-side angle sensor 522 is a rotary encoder of an imaging type in which a camera is used. The output-side angle sensor 522 includes a disk 522*s* and a camera 522*r*. In the output-side angle sensor 522, the camera 522*r* is fixed to the arm element 110*a*. The disk 522*s* is configured to be rotated by a driving force of the servomotor 412 together with an output shaft 512*o* of the speed reducer 512 and the arm element 110*b*. Signs different from one another are recorded in respective angular positions on a side surface of the disk 522*s*. In the output-side angle sensor 522, the signs are read by the camera 522*r* and recognized by image processing, whereby an absolute angular position of a target object is detected. That is, the signs function as gradations.

By providing a rotary encoder configured to detect the angular position Pro of the output shaft 512*o* of the speed reducer 512, compared with a form in which an operating position of a further downstream component driven by an output of the speed reducer 512 (e.g., a position further on the distal end side than the joint J12 in the arm element 110*b*) is measured, an output position of the speed reducer 512 can be accurately detected.

Figure 4:
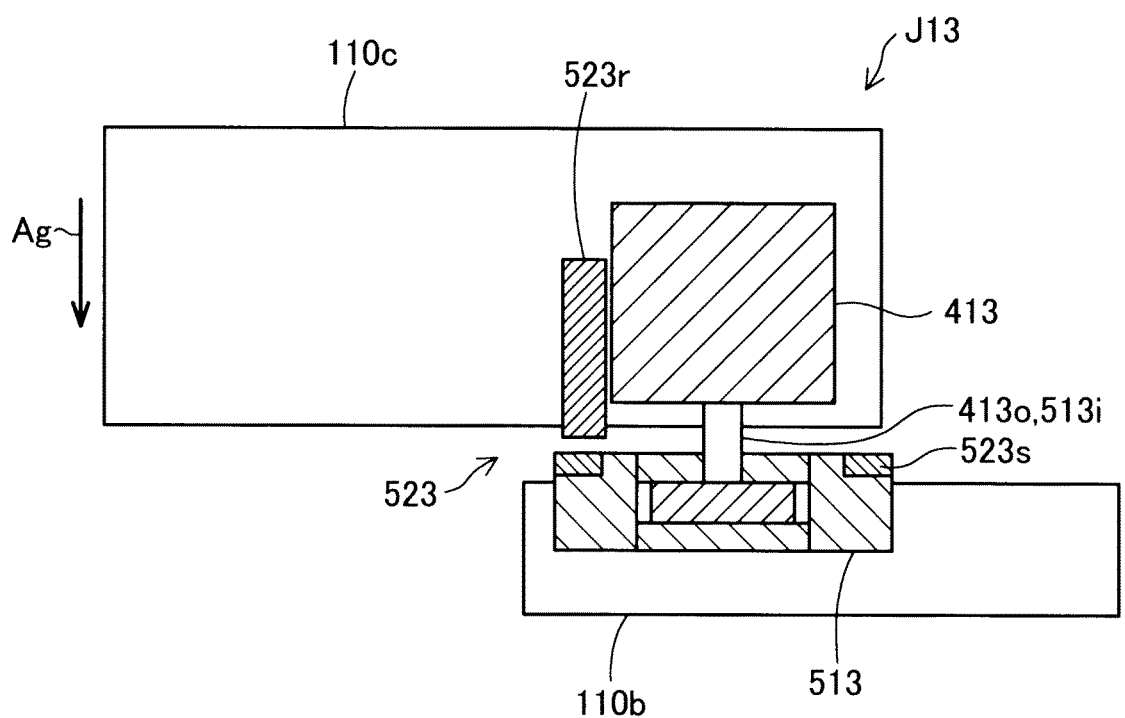
FIG. 4 is an explanatory diagram showing a specific configuration around an output-side angle sensor in the joint.

FIG. 4 is an explanatory diagram showing a specific configuration around an output-side angle sensor 523 in the joint J13 (see FIG. 1). The joint J13 includes a servomotor 413, a motor angle sensor, a speed reducer 513, and the output-side angle sensor 523. Reference numerals attached to the components are reference numerals in which ends of the reference numerals attached to the corresponding components shown in FIG. 2 are changed from 0 to 3. The servomotor 413, a motor angle sensor 423, the speed reducer 513, and the output-side angle sensor 523 are provided in the joint J13 that connects the arm element 110*b* and the arm element 110*c*. Therefore, the servomotor 413, the motor angle sensor 423, the speed reducer 513, and the output-side angle sensor 523 are moved according to the position of the arm element 110*b*. Note that, in FIG. 4 as well, to facilitate distinction of the components, the components are shown with hatchings applied thereto. In FIG. 4, hatched portions are not always portions showing cross sections of members. Note that the motor angle sensor configured to detect an angular position of an output shaft of the servomotor 413 is not shown in FIG. 4 because the motor angle sensor is located on the outer side of a range shown in FIG. 4.

The output-side angle sensor 523 is a rotary encoder of an imaging type in which a camera is used. The output-side angle sensor 523 includes a disk 523*s* and a camera 523*r*. In the output-side angle sensor 523, the camera 523*r* is configured to be rotated by a driving force of the servomotor 413 together with the servomotor 413 and the arm element 110*c*. The disk 523*s* is fixed to a component on an output side of the speed reducer 513. Signs different from one another are recorded in respective angular positions on the upper surface of the disk 523*s*. In the output-side angle sensor 523, the signs are read by the camera 523*r*, which is rotated according to the rotation of the arm element 110*c*, and recognized by image processing, whereby an absolute angular position of a target object is detected. That is, the signs function as gradations.

By providing a rotary encoder configured to detect the angular position Pro of an output of the speed reducer 513, compared with a form in which an operating position of a further downstream component driven by the output of the speed reducer 513 (e.g., a position further on the distal end side than the joint J13 in the arm element 110*c*) is measured, an output position of the speed reducer 513 can be accurately detected.

Whereas the output-side angle sensors 522 and 523 are provided in the joints J12 and J13 explained above, output-side angle sensors are not provided in the joints J11 and J14 and the rotary joint J15 (see FIG. 1).

Figure 5:
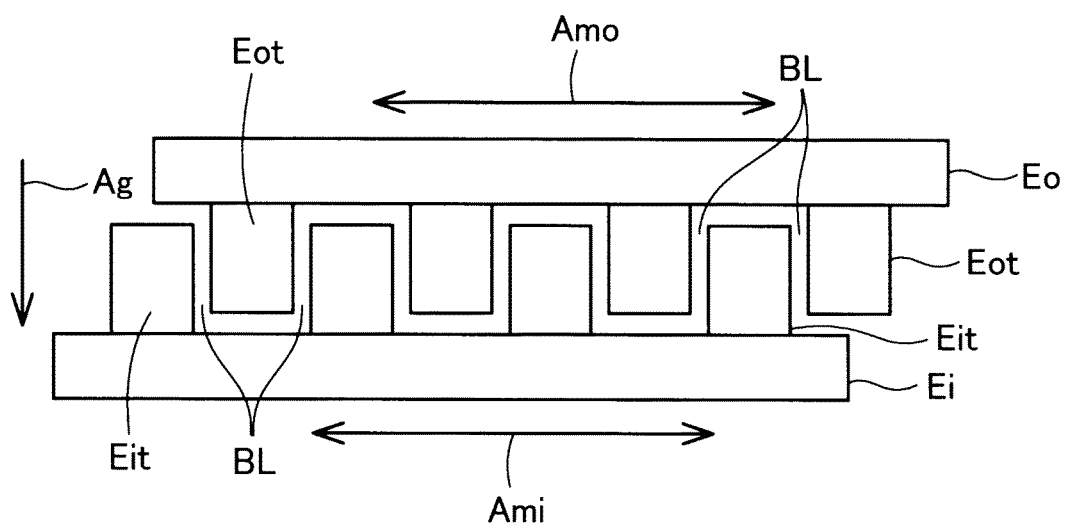
FIG. 5 is a diagram schematically showing a relation between two components that transmit a driving force in the joint.

FIG. 5 is a diagram schematically showing a relation between two components configured to transmit a driving force in the joint J12 (see FIG. 1). In FIG. 5, a component Ei on a side for transmitting a driving force (hereinafter described as "input side") and a component Eo on a side to which the driving force is transmitted (hereinafter described as "output side") are shown. The arm element 110*b* is rotated via the joint J12 along a rotating direction parallel to the horizontal plane with the gravity direction Ag as a rotation axis. That is, in the joint J12, all of the output shaft 410*o* of the servomotor 410 and the input shaft 510*i* and the output shaft 510*o* of the speed reducer 510 rotate with a direction parallel to the gravity direction Ag as rotation axes. Among the components, gaps BL can be present on both sides in rotating directions (Amo and Ami) between a part Eit of the component Ei on the input side and a part Eot of the component Eo of the component Eo on the output side. Note that, to facilitate understanding of the technique, the gaps BL schematically represent errors such as lost motion (an error of positions asymmetrical with respect to the direction of operation due to a static frictional force or elastic torsion of a shaft) and backlash (an error of positions due to a gap between components that transmit a driving force).

In the joint J12, the component Ei on the input side can operate in both directions (see an arrow Ami). The component Eo on the output side receives transmission of a driving force from the component Ei on the input side and operates in the same direction as the component Ei (see an arrow Amo). However, because of the gaps BL between the component Ei on the input side and the component Eo on the output side, after the component Ei on the input side operates in a certain direction, when the component Ei operates in the opposite direction, the component Eo on the output side operates with a delay equivalent to the gaps BL. That is, in the joint J12, the component Eo on the output side does not follow the movement of the component Ei on the input side in a strict sense. The same applies in the joints J13 and J15 (see FIG. 1). In such joints, the operating position, the operating speed, and the operating acceleration of the component on the output side include errors with respect to the operating position, the operating speed, and the operating acceleration of the component on the input side.

Figure 6:
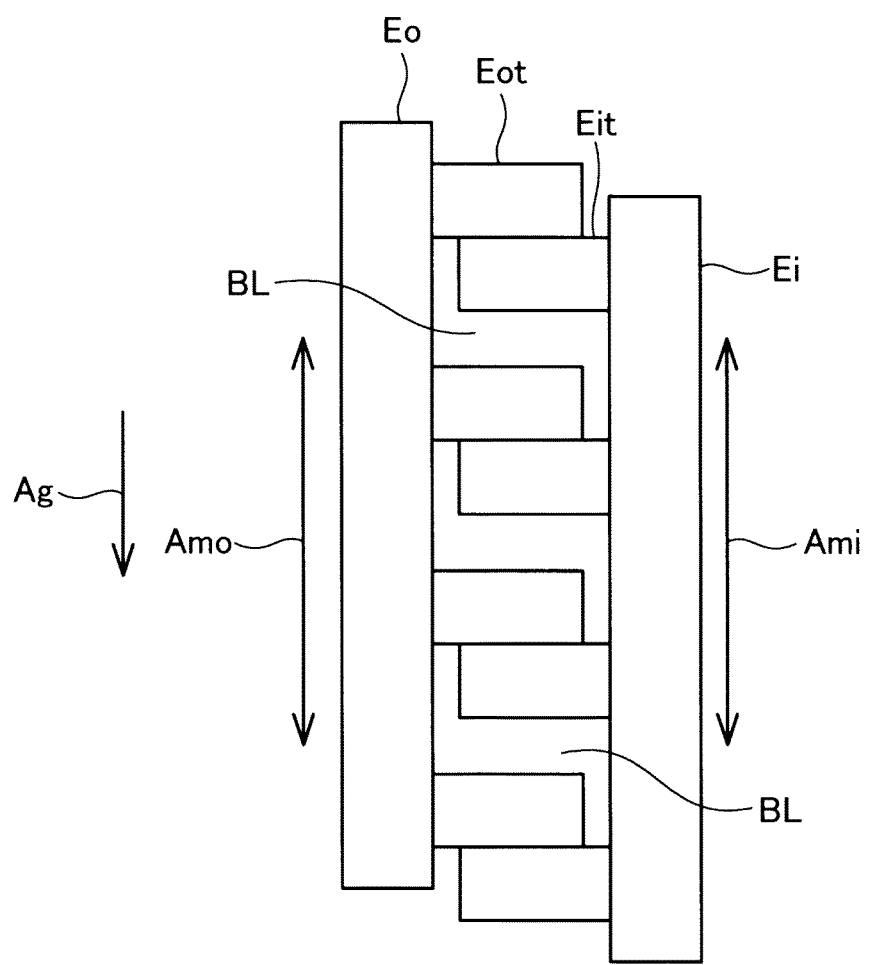
FIG. 6 is a diagram schematically showing a relation between two components that transmit a driving force in a joint.

FIG. 6 is a diagram schematically showing a relation between two components that transmit a driving force in the joint J14 (see FIG. 1). In FIG. 6, the component Ei on a side for transmitting a driving force (an input side) and the component Eo on a side to which the driving force is transmitted (an output side) are shown. The arm element 110d is moved along the gravity direction Ag via a joint J1d. Among components that transmit a driving force in the gravity direction Ag, the gaps BL are also provided in the horizontal direction between the part Eit of the component Ei (specifically, a cylinder section 620d1) on the input side and the part Eit of the component Eo (specifically, the male screw portion of the arm element 110d) on the output side.

In the joint J14 as well, the component Ei on the input side can operate in both the directions (see the arrow Ami). The component Eo on the output side receives transmission of a driving force from the component Ei on the input side and operates in the same direction as the component Ei (see the arrow Amo). However, because the gravity is always applied to the components Ei and Eo, in the joint J14, the part Eot of the component Eo is in contact with the part Eit of the component Ei. The gap BL is present on the component Eo. As a result, a relative positional relation between the component Ei on the input side and the component Eo on the output side are fixed irrespective of the direction of the movement of the component Ei on the input side. Therefore, in the joint J14, the component Eo on the output side substantially accurately follows the movement of the component Ei on the input side. The same applies in the joint J11. In such joints, the operating position, the operating speed, and the operating acceleration on the output side less easily include errors with respect to the operating position, the operating speed, and the operating acceleration on the input side.

In the robot 100 in this embodiment, in the rotary joint J12 in which the arm element 110b is moved in a direction (specifically, the horizontal direction) different from the gravity direction Ag and the rotary joint J13 in which the arm element 110c is moved in a direction (specifically, the horizontal direction) different from the gravity direction Ag, the output-side angle sensors 520 configured to detect the operating positions Pro of the output shafts 510o of the speed reducers 510 are provided (see FIGS. 1, 3, and 5). The servomotors 410 configured to drive the rotary joints J12 and J13 are controlled on the basis of outputs of the output-side angle sensors 520. Therefore, because the arm elements 110b and 110c are moved in directions different from the gravity direction Ag, the arm elements 110b and 110c do not always receive a force (the gravity) in a fixed direction. As a result, concerning the operations of the arm elements 110b and 110c in which errors of positions easily occur (see FIG. 5), the errors can be effectively reduced using the outputs of the output-side angle sensors 520.

In this embodiment, the output-side angle sensors are provided for the two joints J12 and J13. Outputs of the output-side angle sensors are used for the control of the servomotors. Therefore, compared with a form in which an output-side angle sensor is provided for only one joint and an output of the output-side angle sensor is used for the control of the servomotors, control of the entire robot can be more accurately performed.

In the robot 100 in this embodiment, in the joint J11 in which the arm element 110a is moved in the gravity direction Ag and the joint J14 in which the arm element 110d is moved in the gravity direction Ag, output-side angle sensors configured to detect operating positions of the output shafts of the speed reducers are not provided (see FIGS. 1, 3, and 6). Therefore, compared with a form in which output-side angle sensors are also provided in such joints, the configuration of the robot 100 can be simplified. Therefore, limitations in designing the robot can be reduced.

In the robot 100 in this embodiment, the output-side angle sensor 520 is not provided in the rotary joint J15 most distant from the base 180 among the plurality of rotary joints J12, J13, and J15 included in the robot 100. On the other hand, the output-side angle sensor 520 is provided in the rotary joint J12 closest to the base 180 among the plurality of rotary joints J12, J13, and J15 included in the robot 100. The arm element 110b connected to the base 180 via the rotary joint J12 and rotated is controlled on the basis of an output of the output-side angle sensor 520.

An error of the position, the speed, or the acceleration of the operation of the arm element 110b greatly affects the positions, the speeds, or the accelerations of the components (including the rotary joint J15 and the arm element 110d and the end effector 200) provided at the tip of the arm element 110b. In this embodiment, the servomotor 410 configured to drive such an arm element 110b is controlled on the basis of an output of the output-side angle sensor 520. Therefore, compared with a form in which an output-side angle sensor is also provided in the rotary joint J15, it is possible to accurately control the position of the end effector 200 of the robot 100 while simplifying the configuration of the robot 100.

In this specification, the arm element 110b in this embodiment is referred to as "first movable section" as well. The servomotor 410 provided in the joint J12 is referred to as "first driving section" as well. The speed reducer 510 provided in the joint J12 is referred to as "first transmitting section" as well. The output-side angle sensor 520 provided in the joint J12 is referred to as "first output-position detecting section" as well.

In this specification, the arm elements 110a and 110d in this embodiment are referred to as "second movable sections" as well. The servomotors provided in the joints J11 and J14 are referred to as "second driving sections" as well. The speed reducers provided in the joints J11 and J14 are referred to as "second transmitting sections" as well.

In this specification, the arm element 110c in this embodiment is referred to as "third movable section" as well. The servomotor 410 provided in the joint J13 is referred to as "third driving section" as well. The speed reducer 510 provided in the joint J13 is referred to as "third transmitting section" as well. The output-side angle sensor 520 provided in the joint J13 is referred to as "third output-position detecting section" as well.

B. Second Embodiment

Figure 7:
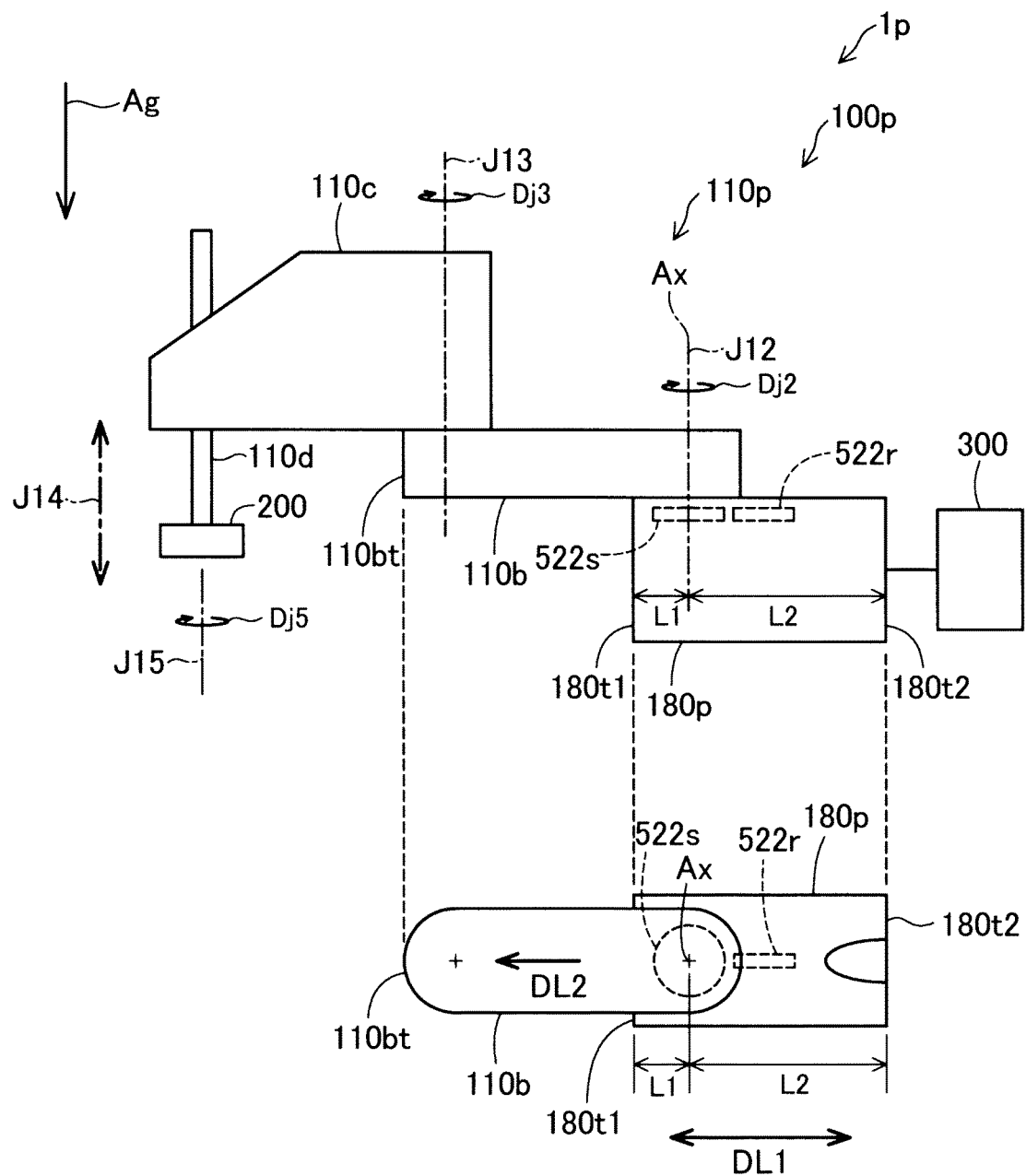
FIG. 7 is an explanatory diagram schematically showing a robot system in a second embodiment.

FIG. 7 is an explanatory diagram schematically showing a robot system 1p in a second embodiment. A side view of the robot system 1p is shown in an upper part of FIG. 7 and a plan view of a part of the robot system 1p is shown in a lower part of FIG. 7. The robot system 1p in this embodiment includes a robot 100p, the end effector 200, and the control device 300.

The robot 100p is a four-axis robot including an arm 110p including four joints J12 to J15. The robot 100p does not include the linear motion joint J11. Therefore, the arm 110p is connected to a base 180*p* via the joint J12. Otherwise, the robot 100*p* is the same as the robot 100 (see FIG. 1) in the first embodiment.

In the robot 100*p*, the arm element 110*b* is moved in a direction different from the gravity direction Ag via one joint J12 connected to the base 180*p*. Therefore, an error of the position, the speed, or the acceleration of the arm element 110*b* greatly affects the positions, the speeds, or the accelerations of other components (including the end effector 200) provided at the tip of the arm element 110*b*. In the robot 100*p*, the servomotor 412 configured to drive such an arm element 110*b* is controlled on the basis of an output of the output-side angle sensor 522 as in the arm element 110*b* of the robot 100 in the first embodiment. Therefore, the robot 100*p* can accurately control the position of the end effector 200 of the robot 100*p*.

Figure 8:
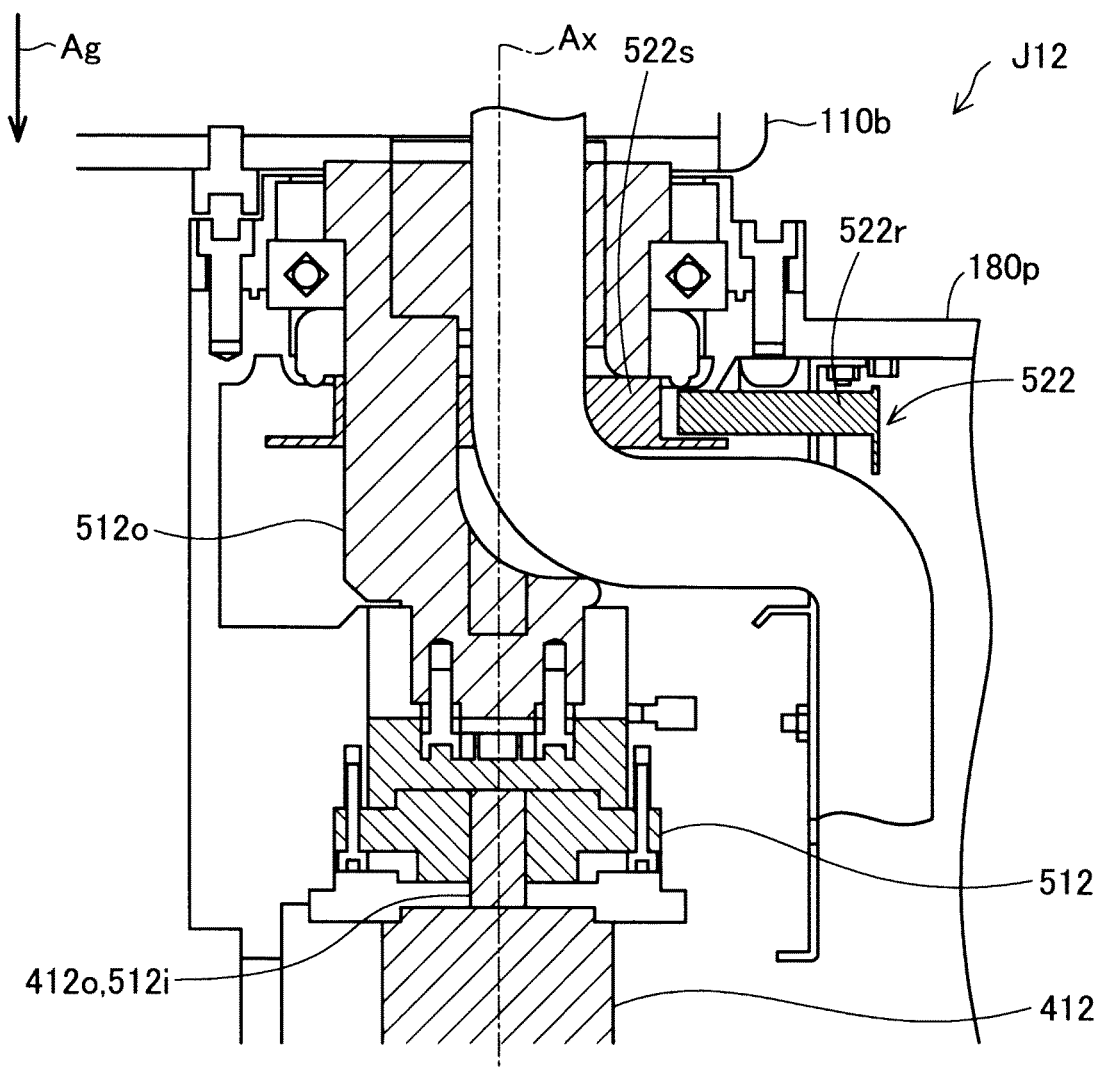
FIG. 8 is an explanatory diagram showing a specific configuration around the output-side angle sensor in the joint of a robot.

FIG. 8 is an explanatory diagram showing a specific configuration around the output-side angle sensor 522 in the joint J12 (see FIG. 7) of the robot 100*p*. In FIG. 8, as in FIG. 3, to facilitate distinction of the components, the components are shown with hatchings applied thereto. In FIG. 8, hatched portions are not always portions showing cross sections of members.

In the joint J12 of the robot 100*p*, the camera 522*r* of the output-side angle sensor 522 is provided in the base 180*p*. Similarly, the servomotor 412 is also fixed to the base 180*p*. Otherwise, the joint J12 of the robot 100*p* is the same as the joint J12 (see FIG. 3) of the robot 100 in the first embodiment.

As shown in the lower part of FIG. 7, in the robot 100*p*, a rotation axis Ax of the arm element 110*b* is located in a position where a distance L1 from one end 180*t*1 in a longitudinal direction DL1 of the base 180*p* is smaller than a distance L2 from the other end 180*t*2 in the longitudinal direction DL1 when viewed from a direction of the rotation axis Ax. The camera 522*r* is provided on the side of the end 180*t*2 of the base 180*p* (in FIG. 7, the right side) with respect to the rotation axis Ax when viewed from the direction of the rotation axis Ax. Note that, in this embodiment, the rotation axis Ax of the arm element 110*b* coincides with the rotation axis of an output shaft 412*o* of the servomotor 412.

When the arm element 110*b* takes a posture in which the longitudinal direction DL1 of the base 180*p* and an extending direction DL2 of the arm element 110*b* from the rotation axis Ax coincide with each other when viewed from the direction of the rotation axis Ax and an overlapping region of the base 180*p* and the arm element 110*b* is smaller (see FIG. 7), the camera 522*r* is located in a place described below. That is, the camera 522*r* is located, with respect to the rotation axis Ax, on the opposite side of the extending direction DL2 of the arm element 110*b* (the right side in FIG. 7).

Note that the posture of the arm element 110*b* in which the longitudinal direction DL1 of the base 180*p* and the extending direction DL2 of the arm element 110*b* from the rotation axis Ax coincides with each other can take two states, that is, a state shown in FIG. 7 (a state in which the base 180*p* and the arm element 110*b* form an angle of 180 degrees) and a state in which the arm element 110*b* rotates 180 degrees from the state shown in FIG. 7 and the arm element 110*b* and the base 180*p* substantially overlap (a state in which the base 180*p* and the arm element 110*b* form an angle of 0 degree). The position of the camera 522*r* is explained above on the basis of the state shown in FIG. 7.

In other words, when a distal end 110*bt* of the arm element 110*b*, the rotation axis Ax of the arm element 110*b*, and the end 180*t*2 of the base 180*p* farther from the rotation axis Ax are arranged in this order, the camera 522*r* is located between the rotation axis Ax and the end 180*t*2 of the base 180*p*.

Heat generated in the servomotor 412 is transmitted to the arm element 110*b* and the base 180*p*. As a result, the arm element 110*b* and the base 180*p* are respectively expanded and deformed by the heat. As a result, it is likely that relative positions of the disk 522*s* and the camera 522*r* of the output-side angle sensor 522 shift and an error is included in a measurement result of the output-side angle sensor 522.

In the second embodiment, the camera 522*r* is provided, with respect to the rotation axis Ax of the arm element 110*b*, on the side of the longitudinal direction DL1 where heat more easily escapes. Therefore, compared with a form in which the camera 522*r* is provided, with respect to the rotation axis Ax, on the side of a latitudinal direction perpendicular to the longitudinal direction DL1, it is less likely that the position of the camera 522*r* with respect to the disk 522*s* is shifted by the heat of the servomotor 412.

Further, in the second embodiment, the camera 522*r* is provided, with respect to the rotation axis Ax of the arm element 110*b*, on the other end 180*t*2 side where a larger portion of the base 180*p* is present than on the one end 180*t*1 side. Therefore, compared with a form in which the camera 522*r* is provided on the one end 180*t*1 side, it is less likely that the position of the camera 522*r* with respect to the disk 522*s* is shifted by the heat of the servomotor 412. Therefore, even when the servomotor 412 generates heat, an operating position on the output side of the speed reducer 512 can be accurately detected.

For example, a form is also conceivable in which a component present between a heat source such as a servomotor and an output-side angle sensor and capable of transmitting heat to the output-side angle sensor is configured by a structure and a material that less easily transmit heat, whereby an error of the output-side angle sensor is reduced. However, in such a form, because heat is less easily radiated from the heat source, it is likely that the temperature of a structure near the heat source rises. When the material that less easily transmits heat is adopted in a part of a configuration, it is also likely that distortion occurs between the material that less easily transmits heat (e.g., resin) and a material adopted from another demand of performance (e.g., a metal material for securing rigidity) because of a difference in a coefficient of thermal expansion. If the configuration in this embodiment is adopted, it is possible to accurately detect an operating position on the output side of the speed reducer 512 while reducing the likelihood of occurrence of such a problem.

Figure 9:
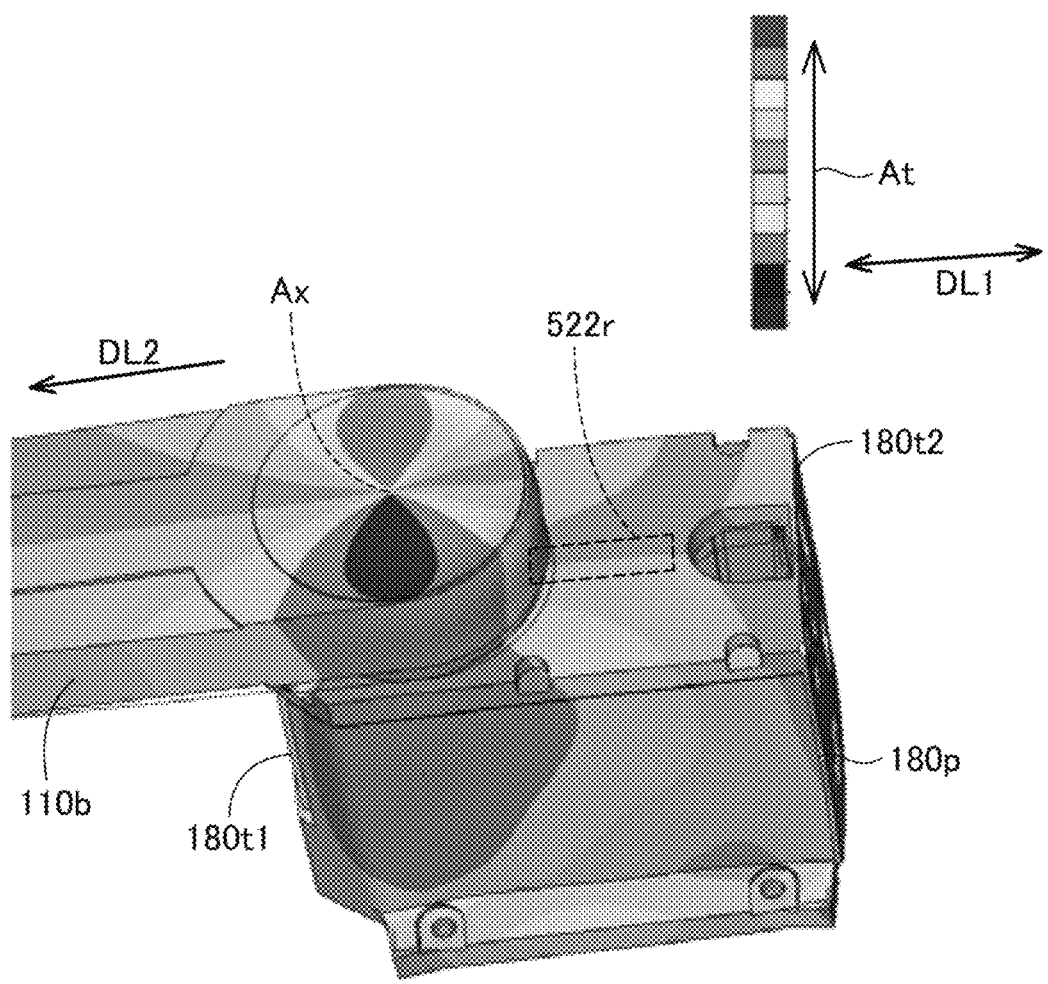
FIG. 9 is a diagram showing a state of deformation of sections that occurs when a servomotor generates heat in a state in which an arm element takes the same posture as a posture shown in FIG. 7 with respect to a base.

FIG. 9 is a diagram showing a state of deformation of sections of the arm element 110*b* and the base 180*p* that occurs when the servomotor 412 generates heat in a state in which the arm element 110*b* takes the same posture as the posture shown in FIG. 7 with respect to the base 180*p*. Density in the center of a scale At shown in the upper right of FIG. 9 represents a deformation amount 0. Density indication further away from the center of the scale At upward indicates that a deformation amount in the clockwise direction centering on the rotation axis Ax is larger. Density indication further away from the center of the scale At downward indicates that a deformation amount in the counterclockwise direction centering on the rotation axis Ax is larger.

As it is seen from a simulation result shown in FIG. 9, a region where the camera 522*r* is provided is a region where deformation in a rotating direction centering on the rotation axis Ax is the smallest.

Figure 10:
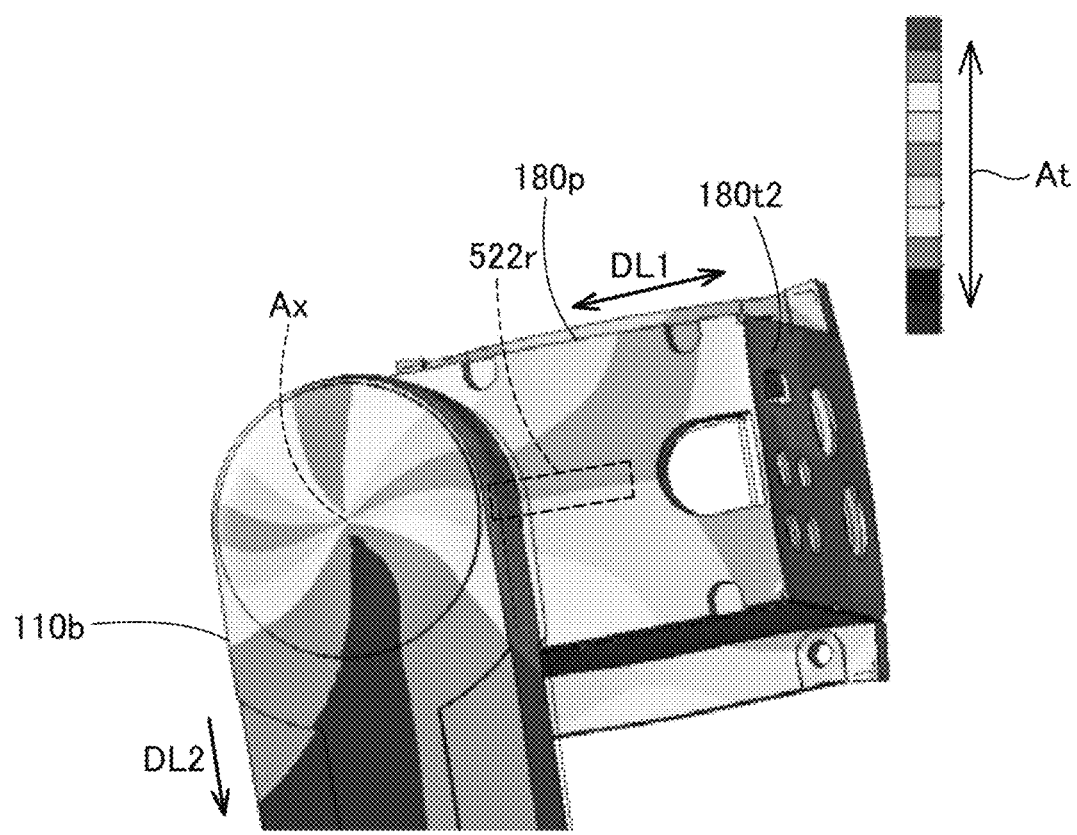
FIG. 10 is a diagram showing a state of deformation of the sections that occurs when the servomotor generates heat in a state in which the arm element takes a posture in which an extending direction of the arm element from a rotation axis and a longitudinal direction of the base form an angle of 90 degrees.

FIG. 10 is a diagram showing a state of deformation of the sections of the arm element 110b and the base 180p that occurs when the servomotor 412 generates heat in a state in which the arm element 110b takes a posture in which the extending direction DL2 of the arm element 110b from the rotation axis Ax and the longitudinal direction DL1 of the base 180p form an angle of 90 degrees. The scale At shown in the upper right of FIG. 10 indicates the same deformation amounts as the deformation amounts indicated by the scale At shown in FIG. 9.

In a simulation result shown in FIG. 10 as well, a region where the camera 522r is provided is a region where deformation in the rotating direction centering on the rotation axis Ax is the smallest.

Figure 11:
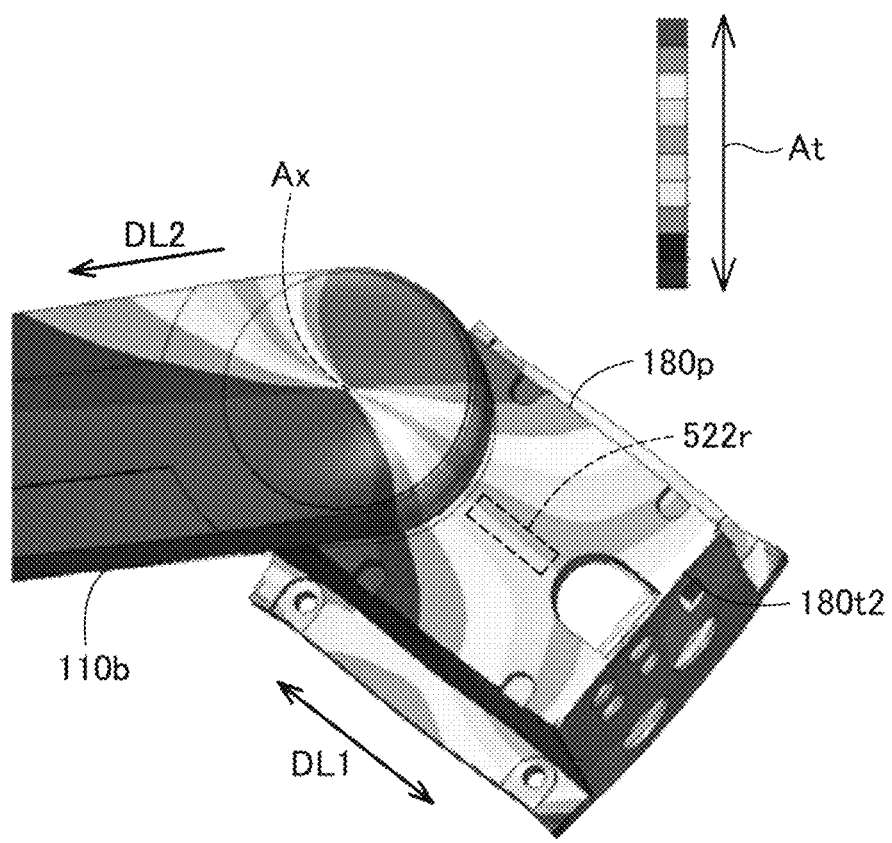
FIG. 11 is a diagram showing a state of deformation of the sections that occurs when the servomotor generates heat in a state in which the arm element takes a posture in which the extending direction of the arm element from the rotation axis and the longitudinal direction of the base form an angle of 120 degrees.

FIG. 11 is a diagram showing a state of deformation of the sections of the arm element 110b and the base 180p that occurs when the servomotor 412 generates heat in a state in which the arm element 110b takes a posture in which the extending direction DL2 of the arm element 110b from the rotation axis Ax and the longitudinal direction DL1 of the base 180p form an angle of 120 degrees. The scale At shown in the upper right of FIG. 11 indicates the same deformation amounts as the deformation amounts indicated by the scale At shown in FIG. 9.

In a simulation result shown in FIG. 11 as well, a region where the camera 522r is provided is a region where deformation in the rotating direction centering on the rotation axis Ax is the smallest.

As it is seen from the simulation results shown in FIGS. 9 to 11, with the robot 100p in the second embodiment, even if the servomotor 412 generates heat, relative angles of the camera 522r and the disk 522s is less easily shifted by thermal deformation. Therefore, even if the servomotor 412 generates heat, the output-side angle sensor 522 can output an accurate angular position.

In this specification, the camera 522r in this embodiment is referred to as "detector" as well. Signs attached to a side surface of the disk 522s are referred to as "gradations" as well.

C. Other Embodiments

C1. Another Embodiment 1

(1) In the embodiments, the technical content is explained with reference to the five-axis robot 100 including the joints J11 to J15 and the four-axis robot 100p including the joints J12 to J15 as the examples. However, the number of joints included in a robot may be three or less or six or more such as six or seven. However, the technique disclosed in this specification is particularly effective in a SCARA robot including a plurality of movable sections configured to rotate with directions parallel to one another as rotation axes and not including a movable section configured to rotate with a direction perpendicular to the rotation axes of the plurality of movable sections as a rotation axis. Note that the SCARA robot may adopt a form including a plurality of movable sections set on a horizontal plane and configured to rotate with the vertical direction as rotation axes or may adopt a form including a plurality of movable sections set on a slope and configured to rotate with predetermined directions, which are not the vertical direction, parallel to one another as rotation axes.

(2) In the embodiments, the output-side angle sensor 522 functioning as the output-position detecting section is the rotary encoder of the imaging type including the disk 522s and the camera 522r. However, the output-position detecting section can also be another component such as an optical rotary encoder or linear encoder including components such as a light emitting element and a light receiving element and a light blocking plate including a slit for causing a part of light to pass. As the output-position detecting section, a detecting section including a magnetic sensor and a magnet can also be adopted. However, the technique disclosed in this specification is particularly effective when the output-position detecting section detects an operating position of a target object according to a change of relative positions of a scale rotated together with a movable section and a detector configured to read the scale.

C2. Another Embodiment 2

In the embodiments, the example is explained in which the output-side angle sensors 520 (522 and 523) functioning as the output-position detecting sections are provided in the rotary joints J12 and J13 (see FIGS. 1 to 4 and 7). However, a form can also be adopted in which an output-position detecting section configured to detect an operating position on the output side of the transmitting section is provided in a joint configured to linearly move a movable section in a direction different from the gravity direction. In a form in which the output-position detecting section is provided in a rotary joint, the operating position on the output side of the transmitting section is an angular position. In a form in which the output-position detecting section is provided in a linear motion joint, the operating position on the output side of the transmitting section is a position along a linear direction. Note that a driving section configured to drive the linear motion joint may be a motor that outputs a rotation output or may be a linear motor.

C3. Another Embodiment 3

(1) In the second embodiment, the output-side angle sensor 522 functioning as the output-position detecting section is provided in the rotary joint J12 provided in the base 180p (see FIG. 7). However, a form can also be adopted in which the output-position detecting section is provided in a linear motion joint provided on the base and configured to move a movable section linearly in a direction (e.g., the horizontal direction or an oblique direction) different from the gravity direction.

(2) A form can also be adopted in which the output-position detecting section is not provided in a joint (which may be either a rotary joint or a linear motion joint) connected to the base (see FIG. 1).

C4. Another Embodiment 4

In the second embodiment, when the arm element 110b takes a posture in which the longitudinal direction DL1 of the base 180p and the extending direction DL2 of the arm element 110b functioning as the first movable section coincide with each other and an overlapping region of the base 180p and the arm element 110b is smaller (see FIG. 7), the camera 522r functioning as the detector is located on the opposite side of the extending direction DL2 of the arm element 110b (the right side in FIG. 7) with respect to the rotation axis Ax. However, in such a state, the detector may be provided on the side of the extending direction of the first movable section with respect to the rotation axis. That is, the detector may be provided in any side with respect to the rotation axis. Note that, concerning a direction perpendicular to the longitudinal direction of a configuration in which the detector is provided, the detector is desirably provided in a position described below. That is, when viewed from a rotation axis direction of a driving section configured to drive a movable section, a range in which the detector is present is desirably provided to include a point in the center of the configuration in which the detector is provided.

C5. Another Embodiment 5

(1) In the second embodiment, the rotation axis Ax of the arm element 110b is present in the position where the distance L1 from the one end 180t1 in the longitudinal direction DL1 of the base 180p is smaller than the distance L2 from the other end 180t2 in the longitudinal direction DL1 (see FIG. 7). However, the rotation axis of the first movable section may be present in the center of the longitudinal direction of the base when viewed from the direction of the rotation axis of the first movable section.

(2) In the second embodiment, the camera 522r functioning as the detector is provided on the side of the end 180t2 of the base 180p farther from the rotation axis Ax (the right side in FIG. 7) with respect to the rotation axis Ax. However, the detector may be provided on the side of the end closer to the rotation axis of the first movable section with respect to the rotation axis of the first movable section when viewed from the direction of the rotation axis of the first movable section. That is, the detector may be provided on any side with respect to the rotation axis of the first movable section.

(3) In the second embodiment, the rotation axis Ax of the arm element 110b functioning as the first movable section coincides with the rotation axis of the output shaft 412o of the servomotor 412 functioning as the first driving section. However, the rotation axis of the first movable section and the rotation axis of the output shaft of the first driving section may be different.

C6. Another Embodiment 6

In the embodiments, the output-side angle sensor 522 functioning as the output-position detecting section is provided in the rotary joint J12 closest to the base 180 among the plurality of rotary joints J12, J13, and J15 included in the robot 100 (see FIGS. 1 to 3 and 7). However, a form can also be adopted in which the output-position detecting section is not provided in a rotary joint closest to the base among a plurality of rotary joints included in the SCARA robot and the output-position detecting sections are provided in the other rotary joints.

C7. Another Embodiment 7

In the embodiments, the output-side angle sensors 520 (522 and 523) functioning as the output-position detecting sections are provided in the rotary joints J12 and J13 rotated in the direction in which the surfaces defined by the circumferential directions Dj2 and Dj3 of the rotation are in the horizontal direction (see FIGS. 1 and 7). However, the output-position detecting section may be provided in a rotary joint rotated in a direction in which the surface defined by circumferential direction of the rotation is in a direction tilting at an angle smaller than 90 degrees with respect to the horizontal plane. That is, the output-position detecting section can be provided in a rotary joint rotated in a direction in which the surface defined by the circumferential direction of the rotation does not include the gravity direction.

C8. Another Embodiment 8

(1) In the embodiments, the output-side angle sensors 520 (522 and 523) functioning as the output-position detecting sections are provided in the rotary joints J12 and J13 rotated in the direction in which the surfaces defined by the circumferential directions Dj2 and Dj3 of the rotation are in the horizontal direction (see FIGS. 1 and 7). Rotary joints rotated in other directions are not provided. However, when a rotary joint rotated in the direction in which the surface defined by the circumferential direction of the rotation includes the gravity direction, that is, a rotary joint in which a rotation axis is in the horizontal direction is provided, the output-position detecting section may be provided in such a rotary joint as well. A form can also be adopted in which the output-position detecting sections are provided in the linear motion joints J11 and J14 in which arm elements are moved in the gravity direction.

(2) In the embodiments, output-side angle sensors are not provided in the joints J11 and J14 and the rotary joint J15 (see FIG. 1). A form can be adopted in which the second driving section (e.g., the servomotor 410d1) provided in a joint not including the output-position detecting section is moved according to the position of the first movable section (e.g., the arm element 110c). A form can be adopted in which the first driving section (the servomotor 412) is moved according to the position of the second movable section (e.g., the arm element 110a) driven by the second driving section. That is, the joint not including the output-position detecting section may be provided at the tip of a joint including the output-position detecting section in an arm or may be provided on the proximal end side in the arm.

C9. Another Embodiment 9

In the embodiments, the output-side angle sensors 520 (522 and 523) functioning as the output-position detecting sections are provided in the rotary joints J12 and J13 rotated in the direction in which the surfaces defined by the circumferential directions Dj2 and Dj3 of the rotation are in the horizontal direction (see FIGS. 1 and 7). However, a form can also be adopted in which the output-position detecting section is provided only for one rotary joint. A form can also be adopted in which, in a robot in which a movable section includes three or more joints moved in directions different from the gravity direction, output-position detecting sections are included in the three or more joints.

C10. Another Embodiment 10

In the embodiments, the robots 100 and 100p include, as the transmitting section, the speed reducer 510 configured to convert a rotation input into a rotation output having lower rotating speed and output the rotation output (see FIGS. 2 to 4 and 8). However, the transmitting section can also be a component configured to convert a rotation input into a rotation output having higher rotating speed and output the rotation output. That is, the transmitting section can be a speed changer configured to convert a rotation input into a rotation output having different speed and output the rotation output. The transmitting section can be a component configured to output a rotation input without changing rotating speed of the rotation input such as a coupling.

C11. Another Embodiment 11

In the embodiments, the robots 100 and 100p include the motor angle sensor 420 functioning as the input-position detecting section configured to detect an operating position on the input side of the speed reducer 510 functioning as the first transmitting section. However, a form can also be adopted in which the input-position detecting section is not provided in a joint in which the output-position detecting section is provided. With such a form, the position, the speed, and the acceleration of the first movable section can be accurately controlled by controlling an output of the first driving section on the basis of an output of the output-position detecting section.

The entire disclosure of Japanese Patent Application No. 2017-206899, filed Oct. 26, 2017 is expressly incorporated by reference herein.

What is claimed is:

1. A SCARA robot comprising:
   a first arm configured to be moved in a direction different from a gravity direction;
   a first motor configured to drive the first arm;
   a first speed reducer, an input shaft of which is connected to the first motor and an output shaft of which is connected to the first arm;
   a first output-side angle sensor configured to detect an operating position on an output side of the first speed reducer; and
   a base not moved by operation of the SCARA robot, wherein
   the first motor is controlled on the basis of an output of the first output-side angle sensor,
   the first arm is connected to the base via one rotary joint,
   the first output-side angle sensor includes:
      a scale rotated together with the first arm by the driving of the first motor; and
      a detector provided in the base and configured to read the scale, and
   when the first arm takes a posture in which, when viewed from a direction of a rotation axis of the first arm, a longitudinal direction of the base and an extending direction of the first arm from the rotation axis coincide with each other and an overlapping region of the base and the first arm is smaller, the detector is provided, with respect to the rotation axis, on an opposite side of the extending direction of the first arm.

2. The SCARA robot according to claim 1, wherein the first arm is rotated by the first motor and the first speed reducer in a direction in which a surface defined by a circumferential direction of rotation does not include the gravity direction.

3. The SCARA robot according to claim 2, comprising:
   a third arm configured to be moved in a direction different from the gravity direction;
   a third motor moved according to a position of the first arm and configured to drive the third arm;
   a third speed reducer, an input shaft of which is connected to the third motor and an output shaft of which is connected to the third arm; and
   a third output-side angle sensor configured to detect an operating position on an output side of the third speed reducer, wherein
   the third motor is controlled on the basis of an output of the third output-side angle sensor.

4. The SCARA robot according to claim 1, wherein the rotary joint is closest to the base among a plurality of rotary joints included in the SCARA robot.

5. The SCARA robot according to claim 4, comprising:
   a third arm configured to be moved in a direction different from the gravity direction;
   a third motor moved according to a position of the first arm and configured to drive the third arm;
   a third speed reducer, an input shaft of which is connected to the third motor and an output shaft of which is connected to the third arm; and
   a third output-side angle sensor configured to detect an operating position on an output side of the third speed reducer, wherein
   the third motor is controlled on the basis of an output of the third output-side angle sensor.

6. The SCARA robot according to claim 1, wherein the first arm is moved in a horizontal direction.

7. The SCARA robot according to claim 6, comprising:
   a third arm configured to be moved in a direction different from the gravity direction;
   a third motor moved according to a position of the first arm and configured to drive the third arm;
   a third speed reducer, an input shaft of which is connected to the third motor and an output shaft of which is connected to the third arm; and
   a third output-side angle sensor configured to detect an operating position on an output side of the third speed reducer, wherein
   the third motor is controlled on the basis of an output of the third output-side angle sensor.

8. The SCARA robot according to claim 1, comprising:
   a second arm configured to be moved in the gravity direction;
   a second motor configured to drive the second arm; and
   a second speed reducer, an input shaft of which is connected to the second motor and an output shaft of which is connected to the second arm, wherein
   the SCARA robot does not include an output-side angle sensor configured to detect an operating position on an output side of the second speed reducer.

9. The SCARA robot according to claim 8, comprising:
   a third arm configured to be moved in a direction different from the gravity direction;
   a third motor moved according to a position of the first arm and configured to drive the third arm;
   a third speed reducer, an input shaft of which is connected to the third motor and an output shaft of which is connected to the third arm; and
   a third output-side angle sensor configured to detect an operating position on an output side of the third speed reducer, wherein
   the third motor is controlled on the basis of an output of the third output-side angle sensor.

10. The SCARA robot according to claim 1, comprising:
    a third arm configured to be moved in a direction different from the gravity direction;
    a third motor moved according to a position of the first arm and configured to drive the third arm;
    a third speed reducer, an input shaft of which is connected to the third motor and an output shaft of which is connected to the third arm; and
    a third output-side angle sensor configured to detect an operating position on an output side of the third speed reducer, wherein
    the third motor is controlled on the basis of an output of the third output-side angle sensor.

11. The SCARA robot according to claim 1, wherein the first speed reducer changes speed of the output of the first motor and transmits the output to the first arm.

12. The SCARA robot according to claim 11, comprising:
    a third arm configured to be moved in a direction different from the gravity direction;

a third motor moved according to a position of the first arm and configured to drive the third arm;

a third speed reducer, an input shaft of which is connected to the third motor and an output shaft of which is connected to the third arm; and a third output-side angle sensor configured to detect an operating position on an output side of the third speed reducer, wherein the third motor is controlled on the basis of an output of the third output-side angle sensor.

13. The SCARA robot according to claim 1, comprising a motor angle sensor configured to detect an operating position on an input side of the first speed reducer, wherein the first motor is controlled on the basis of an output of the motor angle sensor.

14. The SCARA robot according to claim 13, comprising:

a third arm configured to be moved in a direction different from the gravity direction;

a third motor moved according to a position of the first arm and configured to drive the third arm;

a third speed reducer, an input shaft of which is connected to the third motor and an output shaft of which is connected to the third arm; and a third output-side angle sensor configured to detect an operating position on an output side of the third speed reducer, wherein the third motor is controlled on the basis of an output of the third output-side angle sensor.

15. A SCARA robot comprising:

a first arm configured to be moved in a direction different from a gravity direction;

a first motor configured to drive the first arm;

a first speed reducer, an input shaft of which is connected to the first motor and an output shaft of which is connected to the first arm;

a first output-side angle sensor configured to detect an operating position on an output side of the first speed reducer; and a base not moved by operation of the SCARA robot, wherein the first motor is controlled on the basis of an output of the first output-side angle sensor, the first arm is connected to the base via one rotary joint, a rotation axis of the first arm is present, when viewed from a direction of the rotation axis of the first arm, in a position where a distance from one end in a longitudinal direction of the base is smaller than a distance from another end in the longitudinal direction, the first output-side angle sensor includes:

a scale rotated together with the first arm by the driving of the first motor; and a detector provided in the base and configured to read the scale, and the detector is provided on a side of the other end with respect to the rotation axis of the first arm when viewed from the direction of the rotation axis of the first arm.

16. The SCARA robot according to claim 15, comprising:

a third arm configured to be moved in a direction different from the gravity direction;

a third motor moved according to a position of the first arm and configured to drive the third arm;

a third speed reducer, an input shaft of which is connected to the third motor and an output shaft of which is connected to the third arm; and a third output-side angle sensor configured to detect an operating position on an output side of the third speed reducer, wherein the third motor is controlled on the basis of an output of the third output-side angle sensor.

17. The SCARA robot according to claim 15, wherein the first arm is moved in a horizontal direction.

18. The SCARA robot according to claim 15, comprising:

a second arm configured to be moved in the gravity direction;

a second motor configured to drive the second arm; and a second speed reducer, an input shaft of which is connected to the second motor and an output shaft of which is connected to the second arm, wherein the SCARA robot does not include an output-side angle sensor configured to detect an operating position on an output side of the second speed reducer.

19. The SCARA robot according to claim 15, wherein the first speed reducer changes speed of the output of the first motor and transmits the output to the first arm.

20. The SCARA robot according to claim 15, comprising a motor angle sensor configured to detect an operating position on an input side of the first speed reducer, wherein the first motor is controlled on the basis of an output of the motor angle sensor.

* * * * *